United States Patent [19]
Schwarz et al.

[11] 3,743,324
[45] July 3, 1973

[54] ONE-PIECE SLEEVE AND NUT COUPLING MEANS

[75] Inventors: Albert J. Schwarz, Lincolnwood; Richard A. Misak, Chicago, both of Ill.

[73] Assignee: Imperial-Eastman Corporation

[22] Filed: Mar. 15, 1972

[21] Appl. No.: 234,808

[52] U.S. Cl................ 285/3, 285/343, 285/382.7
[51] Int. Cl............................................. F16l 19/08
[58] Field of Search ................. 285/3, 4, 2, 382.7, 285/341, 342, 343, 334.5

[56] References Cited
UNITED STATES PATENTS

| | | | |
|---|---|---|---|
| 1,927,464 | 9/1933 | McIntosh | 285/4 |
| 2,497,274 | 2/1950 | Richardson | 285/3 |
| 2,544,109 | 3/1951 | Richardson | 285/3 |
| 2,641,489 | 6/1953 | Hedberg | 285/334.5 X |
| 3,290,062 | 12/1966 | Ziherl et al. | 285/3 |

FOREIGN PATENTS OR APPLICATIONS

| | | | |
|---|---|---|---|
| 925,028 | 3/1955 | Germany | 285/3 |
| 646,788 | 11/1950 | Great Britain | 285/3 |

Primary Examiner—Thomas F. Callaghan
Attorney—Hofgren, Wegner, Allen, Stellman & McCord

[57] ABSTRACT

A coupling for use in coupling a tube. The coupling means includes a one-piece sleeve and nut element connected by a frangible connector with the sleeve being constructed to permit turning under of the connector upon shearing thereof in the make-up of the fitting. By thusly accommodating the connector within the sleeve, the connector is prevented from wedging between the tube and nut and thereby permits ready disassembly of the coupling when desired.

13 Claims, 5 Drawing Figures

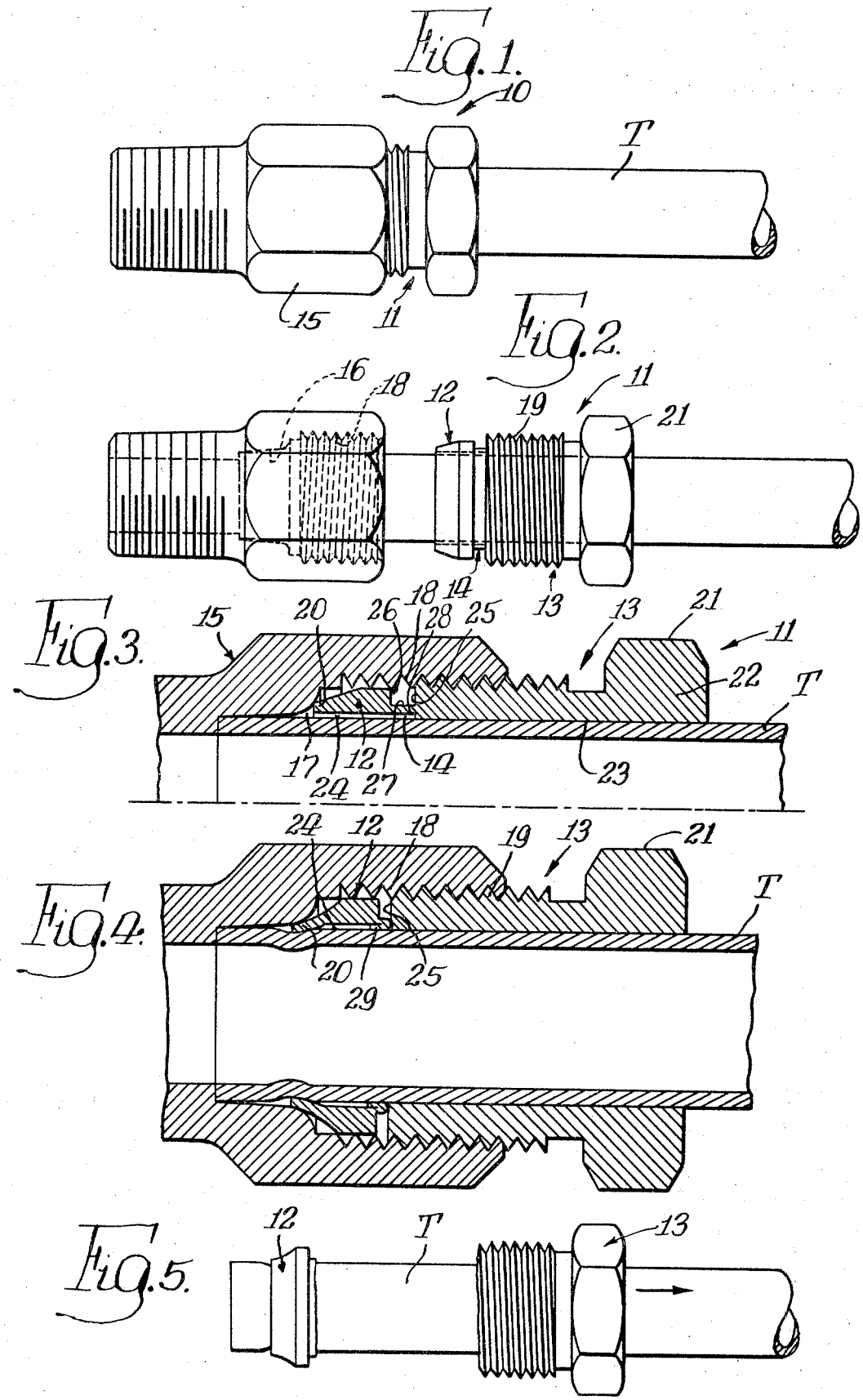

ONE-PIECE SLEEVE AND NUT COUPLING MEANS

BACKGROUND OF THE INVENTION

1. Field of the Invention

This invention relates to tube couplings and in particular to tube couplings utilizing sleeve and nut means for urging the sleeve into sealed engagement with the tube.

2. Description of the Prior Art

In one prior art tube coupling, a one-piece nut and sleeve element is provided for cooperation with a body element permitting the sleeve to shear off from the nut and become attached to the tube in the make-up of the fitting. By integrally connecting the sleeve to the nut, alignment of the sleeve with the body member is automatically effected. Further, such one-piece construction assures the use of the sleeve and effectively precludes installation of the sleeve backwardly in the fitting. An excellent example of such a one-piece nut and sleeve tube coupling is that manufactured by the assignee hereof and identified as a "Hi-Duty" fitting. The "Hi-Duty" fitting has been found to provide facilitated installation and manufacturing economy as a result of the one-piece sleeve and nut construction. The fitting is adapted for use with a customer's port machined into the customer's device, such as a valve pump, etc. Thus, the conventional fitting body may be eliminated.

Further, it has been found, that as the sleeve is an integral part of the nut on initiation of the make-up of the fitting, the sleeve is guided by the nut and prevented from cocking until the deflectible nose portion thereof has been deflected substantially into contact with the tube. As the sleeve effectively contacts the tube at the time the frangible connector breaks, the sleeve is effectively prevented from cocking in the make-up of the joint.

In assignee's prior construction, the connector between the sleeve and nut was provided by a pair of axially spaced grooves, one groove opening radially inwardly and the other opening radially outwardly so as to define an axially thin radial wall which broke in the making up of the fitting to provide the desired separation of the one-piece assembly into discrete sleeve and nut elements. Thus, in the prior design, the nut became a separate element intended to permit disassembly of the fitting when desired, while leaving the sleeve permanently sealingly secured to the tube.

However, it was found that the somewhat expensive procedure of machining a radially inwardly opening groove in the mid-portion of the assembly could be dispensed with by providing a single outwardly opening groove leaving a thin radially inner axially extending connecting wall between the sleeve and nut. This design was utilized in connection particularly with the smaller fittings where utilizing a recessed tool in the relatively small diameter bore was quite difficult. However, it was found that the manufacture of the fitting with the thin axially extending wall presented manufacturing problems. Thus, it was found that the radial motion of the cutting tool placed a transverse load on the fitting which, at times, tended to break off the sleeve from the nut while the fitting was being machined. One attempted solution to this problem was to increase the wall thickness of the connector portion, but it was found that the wall thickness must be maintained quite small to permit proper shearing of the wall as a result of the normal make-up forces generated. Further, it was found that there was a tendency for the broken connector to turn inwardly so that the portion remaining connected to the sleeve at time wedged itself between the nut and tube and, thus, effectively locked the nut and sleeve together on the tube, making it extremely difficult to withdraw the nut in disassembling the fitting.

SUMMARY OF THE INVENTION

The present invention comprehends an improved tube coupling utilizing an improved one-piece sleeve and nut assembly wherein the connector is formed by providing a radially outwardly opening groove between the sleeve and nut portions and providing a cylindrical recess through the sleeve and connector portion up to the nut. The cylindrical recess provides two improved functionings in the present fitting effectively assuring ready removability of the nut when desired after the coupling is fully made up.

More specifically, the broken connector wall is caused to turn under from the sleeve so that the distal portion thereof is received in the annular recess within the sleeve. Thus, the broken connector is effectively directed away from the nut and prevented from wedging between the nut and tube. The recess is preferably maintained as small in radial dimension as practical while permitting reception of the connector end therein so as to permit minimum deflection of the nose portion of the sleeve to effect the desired sealed connection to the tube.

Secondly, the provision of the recess may be effected as the last machining operation, permitting the wall of the connector as first defined by the radially outwardly opening groove, to be relatively thick so as to avoid breaking of the connector portion during the machining of the groove. The machining of the recess comprises an axial machining operating which minimizes any tendency for breaking of the wall so that the final thin wall may be readily provided by a relatively low cost, high speed machining operation.

In the illustrated embodiment, the recess has a depth of approximately 0.002 to 0.003 inch with the connector wall having a radial dimension of approximately 0.003 inch.

Thus, more specifically, the invention comprehends the provision of a one-piece coupling element for coupling a tube to a female coupling element having a port defining an axially inner camming surface and includes a tubular member having an axial bore adapted to coaxially receive the tube to be coupled, an axially inner sleeve portion having a tapered outer surface adapted to engage the camming surface of the female coupling element and be deflected radially inwardly thereby into sealed, locked association with the tube as the result of an axially inward movement of the inner portion thereagainst, an axially outer threaded nut portion adapted to threadedly engage the thread of the female coupling element for effecting axial movement of the male coupling element relative to the female coupling element as an incident of rotation of the male coupling element relative to the female coupling element, a frangible mid-portion connecting the sleeve portion and nut portion, adapted to be broken adjacent the nut portion in the make-up of the coupling, the mid-portion being defined by a radially outwardly opening annular groove, and an annular recess extending coaxially about the bore from the axially inner end thereof to radially inwardly adjacent the mid-portion groove, the frangible portion defining a radially thin connection extending axially between the sleeve portion and nut portion and radially between the radially outwardly opening annular groove and the annular recess and having an inner diameter substantially greater than the diameter of the mid-portion whereby the broken frangible portion is caused to turn under from the sleeve portion and extend into the recess radially within the sleeve portion and thereby be prevented from projecting to between the tube and the nut portion in the made-up arrangement of the coupling.

The present invention is extremely simple and economical of construction while yet providing the highly desirable features discussed above.

BRIEF DESCRIPTION OF THE DRAWINGS

Other features and advantages of the invention will be apparent from the following description taken in connection with the accompanying drawing wherein:

FIG. 1 is a side elevation of a coupling embodying the invention having a tube end connected thereto;

FIG. 2 is a side elevation thereof prior to make-up of the coupling;

FIG. 3 is an enlarged fragmentary diametric section thereof as upon initiation of the make-up of the coupling;

FIG. 4 is a diametric section similar to that of FIG. 3, but upon completion of the make-up of the coupling; and FIG. 5 is a side elevation of the tube with the nut withdrawn axially from the sleeve as in disassembly of the coupling.

DESCRIPTION OF THE PREFERRED EMBODIMENT

In the exemplary embodiment of the invention as disclosed in the drawing, a tube coupling generally designated 10 is shown to comprise a one-piece sleeve and nut assembly 11 including an axially inner sleeve portion 12, an axially outer nut portion 13, and a connector portion 14 extending between the sleeve and nut portions. The one-piece assembly 11 is adapted for connecting a tube T to a female coupling element, such as the coupling element 15, defining a portion 16 having an axially inner camming surface 17 and an axially outer female threaded portion 18. The nut includes a threaded outer portion 19 adapted to threadedly engage threaded portion 18 of element 15 to axially advance the sleeve 12 against the camming surface 17 to urge a deflectible nose portion 20 of the sleeve radially inwardly into sealed locked engagement with the tube, as shown in FIG. 4. Threading torque may be applied to the nut by means of a suitable tool, such as wrench (not shown), applied to suitable tool engaging flats 21 on an outer end portion 22 of the nut.

The assembly 11 defines an axial bore 23 in nut portion 13 which snugly receives the tube T. The sleeve 12 and connector 14 define a continuation of bore 23 effectively enlarged by an annular recess 24 opening axially inwardly through the deflectible portion 20 of the sleeve and extending axially outwardly to a radial planar end surface 25 at the inner end of the nut. Thus, as seen in FIG. 3, the recess 24 provides a clearance space between the outer surface of the tube T and the inner surface of the sleeve 12.

The frangible connector 14 defines a mid-portion of the assembly 10 integrally connecting the sleeve and nut portions and adapted to be broken in the make-up of the coupling adjacent the nut end surface 25 as a result of the torque generated between the nut and the sleeve as the sleeve contacts the tube T when nose portion 20 is deflected thereinto. The frangible mid-portion 14 is defined by a radially outwardly opening annular groove 26 and the outer end of the recess 24, as best seen in FIG. 3, to comprise a thin-walled tubular connector spaced radially outwardly of the tube T. The bottom surface of the groove 25 may comprise a right cylindrical surface 27 and the side walls of the groove 26 may comprise radial planar surfaces 28. The axially outer side wall of the groove is substantially congruent to the outer end of the recess 24 defined by the end wall 25 of the nut.

The radial thickness of the connector wall 14 is preferably very small so as to permit facilitated shearing thereof while yet effectively maintaining the one-piece assembly prior to make-up of the coupling. Illustratively, where the tube T has an outer diameter of approximately one-fourth inch or smaller, the connector wall 14 may have a thickness of approximately 0.003 inch. The radial depth of the recess 24 is coordinated with the thickness of the connector portion to assure reception of the turned end thereof into the recess 24 in making up the coupling, as shown in FIG. 4. It has been found that a recess depth of approximately 0.002 to 0.003 inch similar to the thickness of the connector wall provides excellent functioning of the coupling, as discussed above.

As discussed above, the assembly 11 provides improved economy in construction. By performing the final step of forming the thin connector wall 14 as an axial machining step, this step can be formed by simple reamer, boring tool, or step drill without substantial likelihood of breaking of the connector. Other configurations of the end wall 25 and groove walls 27 and 28 may be employed within the scope of the invention although it has been found that the disclosed construction provides excellent functioning in the use of the coupling.

In making up the coupling, the user merely inserts the tube T through the one-piece sleeve and nut assembly 11 into endwise engagement with the female coupling element. The assembly 11 is then slid along the tube to bring the threaded nut portion 19 into threaded engagement with the female coupling element threaded portion 18. The assembly 11 may then be finger-tip advanced to bring the sleeve nose 20 into engagement with the camming surface 17. Further, forcible torqueing of the nut may be effected to deflect the sleeve nose 20 into engagement with the tube T and concurrently effect a shearing of the connector wall 14 from the nut. The wall 14 projecting outwardly from the sleeve is caused to turn under, as shown in FIG. 4, to have the distal end portion 29 extend into the recess 24 and, thus, away from the nut portion 13 thus effectively avoiding projection of the broken connector to between the nut and tube as may sometimes occur in the prior art couplings of this type.

Resultingly, when it is desired to disassemble the coupling, the user need merely unthread the nut 13 from the female connector element 15, permitting the nut to be backed away from the sleeve 12 which is now permanently secured to the tube T, as shown in FIG. 5. The coupling may be connected and disconnected repeatedly as desired with the sleeve providing the desired sealed connection between the tube and the female element, as shown in FIG. 4.

As shown in FIG. 4, the frangible connector 14 tends to shear adjacent nut end wall 25, thus effectively eliminating a projection on nut 13 which might tend to bind with the projection of the broken connector from the sleeve. The wall 25, thus, acts as a camming surface acting to effect the desired under-turning of the connector portion as shown in FIG. 4.

Thus, the coupling 10 provides an improved low cost tube coupling which is simple and economical of construction while yet providing an improved tube joint which may be readily disconnected when desired.

The foregoing disclosure of specific embodiments is illustrative of the broad inventive concepts comprehended by the invention.

We claim:

1. For use with a female coupling element having a port defining an axially inner camming surface and an axially outer thread, a one-piece male coupling element for coupling a tube to said female coupling element comprising
   a tubular member having an axial bore adapted to coaxially receive the tube to be coupled,
   an axially inner sleeve portion having a tapered outer surface adapted to engage said camming surface of the female coupling element and be deflected radially inwardly thereby into sealed, locked association with the tube as the result of an axially inward movement of said inner portion thereagainst,
   an axially threaded nut outer portion adapted to threadedly engage said thread of the female coupling element for effecting axial movement of said male coupling element relative to said female coupling element as an incident of rotation of the male coupling element relative to the female coupling element,
   a frangible mid-portion connecting said sleeve portion and nut portion adapted to be broken adjacent said nut portion in the make-up of the coupling, said mid-portion being defined by a radially outwardly opening annular groove, and
   an annular recess extending coaxially about said bore from the axially inner end thereof to radially inwardly adjacent said mid-portion groove, said frangible portion defining a radially thin connection extending axially between said sleeve portion and nut portion and radially between said radially outwardly opening annular groove and said annular recess and having an inner diameter substantially greater than the inner diameter of said nut portion whereby the broken frangible portion is caused to turn under from said sleeve portion substantially 180° and extend into said recess radially within the sleeve portion the end of said frangible portion facing toward the axially inner end of the bore, whereby said frangible portion is prevented from projecting to between the tube and said nut portion in the made-up arrangement of the coupling.

2. The coupling element structure of claim 1 wherein said recess is defined by a radial, planar axially outer end surface.

3. The coupling element structure of claim 1 wherein said groove is defined by a right cylindrical, radially inner bottom surface.

4. The coupling element structure of claim 1 wherein said groove is defined by radial, planar axially inner and outer side surfaces.

5. The coupling element structure of claim 1 wherein said recess is defined by an axially outer end surface disposed substantially congruently to the axially outer end of said groove.

6. The coupling element structure of claim 1 wherein said frangible portion has a radial thickness of approximately 0.003 inch where said bore of said nut portion has a diameter approximately one-fourth inch or smaller.

7. The coupling element structure of claim 1 wherein the depth of the annular recess and the strength characteristics of the frangible mid-portion are preselected to correlate with the deflectibility of the sleeve axially inner portion whereby the sleeve inner portion is deflected substantially into engagement with the tube prior to the breaking of the frangible mid-portion in the make-up of the coupling.

8. The coupling element structure of claim 1 wherein said frangible mid-portion is broken substantially at the nut portion.

9. The coupling element structure of claim 1 wherein said recess has a radial depth of a approximately 0.002 to 0.003 inch.

10. The coupling element structure of claim 1 wherein the radial thickness of said frangible portion is similar to the radial depth of said recess.

11. A one-piece nut and sleeve tube-coupling element comprising:
    an annular sleeve having a tapered, deflectible nose and an outer rigid end;
    a nut having a rigid inner end and a bore adapted to coaxially snugly receive a tube to be coupled, the internal diameter of said sleeve being substantially greater than said tube to define an annular recess therebetween; and
    a frangible, thin walled annular connector extending between said sleeve and nut coaxially of said bore, said frangible connector defining a radially thin connection extending axially between said sleeve and nut and having an inner diameter substantially greater than the inner diameter of said nut whereby the broken frangible connector is caused to turn under from said sleeve substantially 180° and extend into said recess radially within the sleeve, the end of said frangible connector facing toward the axially inner end of the bore, whereby said frangible connector is prevented from projecting to between the tube and said nut in the made-up arrangement of the coupling.

12. The tube-coupling element of claim 11 wherein said sleeve has an inner diameter approximately 0.002 to 0.003 inch greater than the inner diameter of the nut.

13. The tube-coupling element of claim 11 wherein said connector has a constant wall thickness.